Figure 1:
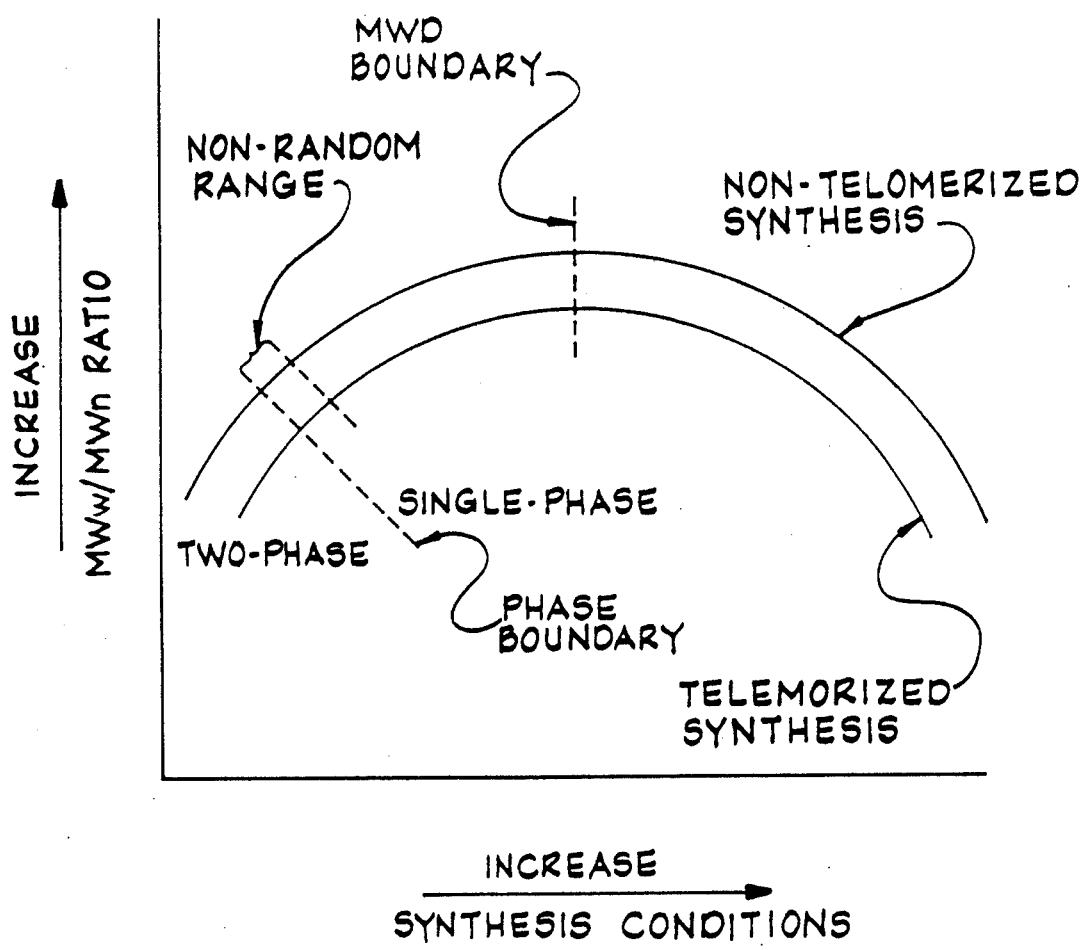

| United States Patent [19] | [11] | Patent Number: | 4,988,781 |
|---|---|---|---|
| McKinney et al. | [45] | Date of Patent: | Jan. 29, 1991 |

[54] PROCESS FOR PRODUCING HOMOGENEOUS MODIFIED COPOLYMERS OF ETHYLENE/ALPHA-OLEFIN CARBOXYLIC ACIDS OR ESTERS

[75] Inventors: Osborne K. McKinney, Lake Jackson; David A. Eversdyk, Angleton; Michael E. Rowland, Lake Jackson, all of Tex.

[73] Assignee: The Dow Chemical Company, Midland, Mich.

[21] Appl. No.: 316,257

[22] Filed: Feb. 27, 1989

Related U.S. Application Data

[63] Continuation-in-part of Ser. No. 44,865, Apr. 30, 1987, abandoned.

[51] Int. Cl.$^5$ .......................... C08F 2/38; C08F 210/00
[52] U.S. Cl. .......................................... 526/68; 526/67; 526/89; 526/194; 526/204; 526/208; 526/209; 526/210; 526/212; 526/213; 526/217; 526/220; 526/222; 526/318.6; 526/329
[58] Field of Search .................... 526/88, 318.3, 318.6, 526/329, 331, 913, 222, 67, 68, 89, 194, 204, 208, 209, 210, 212, 213, 217, 220

[56] References Cited

U.S. PATENT DOCUMENTS

| 3,029,230 | 4/1962 | Strauss | 526/331 X |
| 4,351,931 | 9/1982 | Armitage | 526/317 X |
| 4,417,035 | 11/1983 | Oeder et al. | 526/318.6 X |
| 4,599,392 | 7/1986 | McKinney et al. | 526/318.6 X |

*Primary Examiner*—Joseph L. Schofer
*Assistant Examiner*—F. M. Teskin

[57] ABSTRACT

A homogeneous, random interpolymer of ethylene and an alpha-olefinically unsaturated carboxylic acid or ester having a melt flow rate in the range of about 0.1 to about 300 g/10 minutes, as determined by ASTM D-1238 (190° C./2160 g), is improved during its manufacture when made in a substantially constant environment in a stirred autoclave under substantially steady-state conditions of temperature, pressure, and flow rates, said temperature and pressure being sufficient to produce a single phase reaction, using a free-radical initiator, said improvement being obtained by the use of a minor amount of a telogenic modifier in the reaction mixture, the process being further characterized by the use of either, or both, of (a) a temperature which is lower than that which would be required without the presence of the telogen, or (b) a pressure which is higher than that which would be required without the presence of the modifier.

21 Claims, 1 Drawing Sheet

PROCESS FOR PRODUCING HOMOGENEOUS MODIFIED COPOLYMERS OF ETHYLENE/ALPHA-OLEFIN CARBOXYLIC ACIDS OR ESTERS

CROSS REFERENCE TO RELATED APPLICATION

This is a continuation-in-part of pending application Ser. No. 044,865 filed Apr. 30, 1987, now abandoned.

FIELD OF THE INVENTION

Modified copolymers of random interpolymers of ethylene/alpha-olefinically unsaturated carboxylic acids or their esters.

BACKGROUND OF THE INVENTION

High molecular weight, normally solid interpolymers of ethylene and unsaturated carboxylic acids, such as acrylic acid and methacrylic acid, are well known. This present disclosure pertains to such interpolymers when made in a continuous manner under steady state conditions in well-stirred reactors at high pressure and elevated temperature using a free-radical type initiator whereby random, homogeneous interpolymers are made which are substantially of uniform composition, in contradistinction to polymers made under non-steady state conditions or in nonstirred tubular reactors or in batch reactions or in non-telomerized reactions, and in contradistinction to block copolymers or graft copolymers. In particular, the present disclosure pertains especially to high molecular weight random interpolymers of ethylene and unsaturated carboxylic acids with improved extrusion stability.

Patents which disclose interpolymerizations of ethylene and unsaturated carboxylic acids in a steady state reaction at high pressure and high temperature in a stirred reactor in the presence of a free-radical initiator are, Canadian Pat. No. 655,298 (and its U.S. counterpart U.S. Pat. No. 4,351,931): U.S. Pat. Nos. 3,239,370: 3,520,861: 3,658,741: 3,884,857: 3,988,509: 4,248,990: 4,252,924: 4,417,035 and 4,599,392.

U.S. Pat. No. 3,239,370 discloses a random copolymerization of ethylene with an unsaturated carboxylic acid (e.g., acrylic acid) in a stirred autoclave reactor operated at 16,000 psi. and 210° C. using a peroxide initiator, the so-formed copolymer being particularly useful as a coating for non-metallic substrates.

U.S. Pat. No. 3,520,861 discloses a substantially homogeneous, compositionally uniform, random copolymer of ethylene/unsaturated acid (e.g., acrylic acid, methacrylic acid or crotonic acid) prepared in a continuous manner in a stirred autoclave reactor at high pressure and elevated temperature, using a free-radical initiator (such as a peroxide). The temperature of the polymerization is disclosed as being in the range of about 120° C. to about 300° C., preferably about 150° C. to about 250° C. The pressure of the polymerization is disclosed as being in the range of at least 1000, preferably between about 1000–3000 atmospheres, esp. between 1100–1900 atmospheres. The process is preferably operated using a recycle of the unreacted ethylene and comonomer to which make-up quantities of ethylene and comonomer are added prior to reinjection into the stirred autoclave.

Canadian Pat. No. 655,298 and its U.S. counterpart (U.S. Pat. No. 4,351,931) discloses homogeneous, compositionally uniform, random copolymers of ethylene and unsaturated carboxylic acids (e.g., acrylic acid) wherein said copolymer comprises at least about 90% by weight of ethylene with a melt index of 0.01 to 30 g/10 minutes. The copolymers are prepared in a well-stirred reactor at a pressure of at least 1000 atmosphere, at 90°–280° C., using a free-radical initiator, while maintaining the ratio of monomers (ethylene/acid) in the range of 10,000/1 to 50/1 by weight, the process being performed continuously by feeding monomers in, while removing reaction mixture, and maintaining a constant reaction environment.

U.S. Pat. No. 3,658,741 discloses homogeneous copolymers of ethylene and unsaturated carboxylic acids and esters, prepared in the presence of a telogen or chain-transfer agent, a free-radical catalyst, a temperature between 100° and 300° C. and a pressure between 100 and 1000 atmospheres, using turbulent agitation: the reaction is said to occur in the vapor phase and produces very low molecular weight emulsifiable copolymers i.e., waxes.

U.S. Pat. Nos. 3,884,857 and 3,988,509 disclose the preparation of copolymers, such as ethylene/acrylic acid copolymers, in a continuous, high pressure, free-radical polymerization process, at 100°–250° C. and 1000–2500 atmospheres of pressure.

U.S. Pat. No. 4,248,990 discloses copolymers, e.g., ethylene/acrylic acid copolymers which are said to be distinguished over the random copolymers of Canadian Pat. No. 655,298 and of U.S. Pat. No. 3,520,861 by virtue of being non-random. This non-randomness is said to be the result of operating the steady state, high pressure, stirred reactor at a pressure of from 0 to about 500 psi. above, and at a temperature of from 0°–15° C. above, that needed to maintain a single-phase reaction mixture at the given concentration of copolymer in the reaction mixture and at the given comonomer content of the polymer. This patent also teaches that the temperature and pressure for the phase change from 2-phase to single phase, and from non-random to random is dependent on the particular monomers and ratios of monomers being used.

U.S. Pat. No. 4,252,924 discloses the preparation of non-random copolymers, e.g., ethylene/acrylic acid copolymers in at least two constant environment stirred autoclaves in series, each using a single-phase reaction mixture, but where each succeeding autoclave is maintained at a temperature of at least 30° C. above that of the preceding autoclave.

U.S. Pat. No. 4,417,035 discloses copolymers having from 1,500 to 20 MFI (melt flow rate) units as measured at 160° C. under 325 g load, i.e. ASTM D-1238 (160° C./325 g). Such polymers have melt flow rates of more than 350 g/10 minutes when measured in accordance with ASTM D-1238 (190° C./2160 g).

U.S. Pat. No. 4,599,392 discloses homogeneous, random interpolymers, e.g., ethylene/acrylic acid copolymers, prepared in a constant environment, steady state reaction mixture using a well-stirred autoclave reactor at continuous single-phase operation, that necessitates elevated temperatures and pressures wherein the phase boundary is exceeded and a molecular weight distribution (MWD) boundary is reached or surpassed. Narrow molecular weight distributions are said to be attainable at elevated temperatures and pressure however, exact or useful molecular "tailoring" capabilities are largely limited by the position of the phase boundary and the MWD boundary relative to given reaction temperature and pressure capabilities. This patent is incorporated herein by reference.

Whereas the use of telogens or chain-transfer agents to control molecular weights and polymer densities is common in ethylene homopolymerizations, operators of processes involving interpolymerizations of ethylene and unsaturated carboxylic acids are not inclined to employ chain-transfer agents due to the proclivity of ethylene/carboxylic acid interpolymers to undergo beta-scission during the polymerization reaction and thereby form relatively low molecular weight polymers in contradistinction to high pressure low density polyethylene (LDPE) homo-polymerization at the same reaction conditions.

If a chain-transfer agent is also introduced into the interpolymerization reaction, the polymer molecular weight is further lowered and even higher pressures and/or lower temperature are required for additional compensation to produce the targeted high molecular weight interpolymer. However higher pressures dictate more energy and lower temperatures sacrifice conversion (production rate), and thereby in the absence of any recognized benefit, utilization of a chain-transfer agent is deemed unnecessary and futile for ethylene and unsaturated carboxylic acid interpolymerizations.

We have now found, by operation of the present invention, that it is possible to utilize a chain-transfer agent (telogen) in ethylene and unsaturated carboxylic acid interpolymerizations to control molecular weight distributions and long chain branching and achieve unexpected benefits while maintaining high molecular weights.

SUMMARY OF THE INVENTION

With reference to random interpolymers of ethylene and olefinically-unsaturated organic comonomers prepared in a well-stirred autoclave and in the presence of a free-radical initiator, under substantially steady state continuous operation and substantially constant elevated synthesis conditions that surpass the respective molecular weight distribution boundary (as described in U.S. Pat. No. 4,599,392), it has now been found, surprisingly and unexpectedly, that substantial and useful improvements are possible by telogen utilization at somewhat reduced reaction temperatures while maintaining or increasing reaction pressures. Such utilization enables the preparation of single-phase, low gel interpolymers characterized by substantially narrow molecular weight distributions (and/or less high molecular weight polymer fractions) and appreciably reduced levels of long chain branching. Given these intrinsic modifications, interpolymers with substantially improved extrusion stability can be produced which, for example, in the instance of interpolymers intended for extrusion coating or coextrusion coating purposes, possess appreciably improved draw-down and those intended for blown film purposes exhibit substantially improved optics.

Thus, in the practice of the present invention the benefits of the use of telogens are obtained by using, in the interpolymerization reaction either, or both, of (a) a temperature which is lower than that which would be required to obtain single phase operation without the presence of the telogen, or (b) a pressure which is higher than that which would be required to obtain single phase without the presence of the telogen.

DETAILED DESCRIPTIONS OF THE INVENTION

FIG. 1 is presented as a visual aid for relating the present inventive concept and is not drawn to scale.

In this disclosure all percents are by weight unless noted otherwise.

In FIG. 1 it is shown that when a chain-transfer agent is introduced into the reaction mixture, throughout the entire range of synthesis conditions (of temperature and pressure) narrower molecular weight distributions are obtained relative to non-telomerized synthesis. Also, FIG. 1 shows that telomerized synthesis is characterized by the same trending exhibited for ordinary, non-telomerized synthesis, i.e., as synthesis conditions are increased, at lower temperatures relative to non-telomerized synthesis, the polymerization reaction occurs at conditions beyond the phase boundary and non-random range into single-phase operation, and ultimately a molecular weight distribution (MWD) boundary is reached and then surpassed.

The extent of temperature reduction to compensate for the use of telogen is limited by the onset of microgels (phase separation) and/or non-randomness. Moreover, at a constant elevated pressure and constant unreacted gas recycle rate, as telogen or modifier concentration is increased and reaction temperature is commensurately decreased to allow a constant high (average) molecular weight, the interpolymer will possess a corresponding narrower molecular weight distribution and/or less high molecular weight polymer fractions (although the avg. mol. wt. is the same).

Conversely, at a constant reduced reaction temperature and constant unreacted gas recycle rate, as telogen or modifier concentration is increased and reaction pressure is commensurately increased to provide a constant high (average) molecular weight, the interpolymer will possess a corresponding narrower molecular weight distribution and/or less high molecular weight polymer fractions.

The effect of reduced reaction temperature is attributable to reduced post-reactor temperatures which serve to mitigate in-process free-radical crosslinking (initiated by excess peroxides and/or excessive thermal history) that in effect broadens the molecular weight distribution, particularly on the high molecular weight portion of the whole polymer, and extends branching through a back-biting mechanism. "Back-biting" is a term used in the art to signify a result often referred to as "degradative crosslinking" caused by a chain fragment attaching to another polymer chain.

The effect of increased reaction pressure, which tends to narrow the molecular weight distribution for interpolymerizations above the MWD boundary, is attributed to favorable changes in reaction kinetics and initiator efficiencies.

Thus the most narrow molecular weight distribution, low gel random interpolymer will be prepared at the highest available reaction pressure and at about 0–10° C. above the temperature at which non-randomness occurs for a given comonomer concentration and chain-transfer agent. Skilled practitioners, having read this disclosure, will understand that in these interpolymerizations, certain chain-transfer agents (e.g., methanol) tend to shift phase-equilibria (the phase boundary) to lower synthesis conditions due to favorable solubility effects and thereby allow the preparation of interpolymers with even narrower molecular weight distributions (and/or less high molecular weight polymer fractions) and lower levels of long chain branching while maintaining randomness and low microgel levels. The currently known art alternative to shifting phase-equilibria to lower synthesis conditions while maintaining low microgel levels is to reduce the comonomer concentration in the reaction zone and thereby in the interpolymer. This alternative, however, serves to actually broaden the molecular weight distribution and substantially reduce adhesion to polar substrates and appreciably decrease optics, heat seal strength and hot tack strength: these results, in the context of the present invention, are adverse results.

Whereas the present inventive concept is perceived as being broadly applicable to interpolymers of ethylene and olefinically-unsaturated organic comonomers, where ethylene comprises the majority amount of the monomer mixture, it is especially applicable to acrylates, methacrylates, vinyl esters, and olefinically unsaturated carboxylic acids as comonomers. It is most especially applicable, and preferably used, in preparing polymers of ethylene interpolymerized with acrylic acid or methacrylic acid. The ensuing descriptions reflect this preference of acrylic acid and methacrylic acid as comonomers.

This disclosure pertains to a process for preparing homogeneous, random, low gel ethylene copolymers with improved extrusion stability, especially improved copolymers of ethylene and carboxylic acid comonomers. It is an objective of this invention to provide ethylene copolymers which are particularly well-suited for adhesive, coating and/or packaging purposes and as extrusion resins. The objectives of the present invention are accomplished by preparing, especially, a copolymer of ethylene and 0.1–35 weight percent of an $\alpha,\beta$-ethylenically unsaturated carboxylic acid (e.g., acrylic acid and methacrylic acid) having a melt index in the range of from about 0.1 to not more than about 300 g/10 minutes, preferably not more than about 75 g/10 minutes, most preferably in the range of about 0.5–25 g/10 minutes, measured by ASTM D1238E (190° C./2160 gm). The interpolymer contains about 65–99% of ethylene, preferably about 88–99% ethylene and about 0.1–35% of the comonomer, preferably about 1–12%.

By "homogeneous, random", it is meant that substantially all of the copolymer molecules have substantially the same chemical composition although their molecular weight can vary, and that the copolymer has a ratio of weight percent adjacent acid to total weight percent carboxylic acid in the copolymer less than 0.44 (as determined in accordance with U.S. Pat. No. 4,248,990).

By "low gel", it is meant that the copolymer was prepared substantially at single-phase synthesis conditions and has a gel rating less than 2 (as determined in accordance with U.S. Pat. No. 4,599,392).

By "narrow molecular weight distribution", it is meant that for a particular comparison (of equivalent comonomer content and molecular weight) the subject copolymer will have a numerically smaller weight-average molecular weight to number-average molecular weight ratio relative to the reference copolymer and/or the subject copolymer will have less high molecular weight polymer fractions as indicated by a lower cumulative fractional weight percent at an arbitrarily high molecular weight fraction for the given copolymer. Molecular weight ratios and fractional weight percentages are determined from gel permeation chromatography analysis which may require an esterification pretreatment. By "reduced long chain branching", it is meant that the subject copolymer is comprised of molecules that have statistically shorter chain lengths but more branches in contradistinction to a copolymer comprised of molecules with less branches and statistically longer chain lengths. While these molecular or statistical branching variations are distinct, the varied copolymers may have the same number of total carbons and carboxylic acid concentration (i.e., the same molecular weight). Branching characteristics are conveniently determined by solution intrinsic viscosity analysis.

The copolymers of the present invention combine toughness, flexibility and chemical resistance with outstanding, inherent extrusion stability and reduced microgel levels that allow substantially improved extrusion coating, injection molding and blown film properties. One of the surprising attributes of the copolymers of the present invention is that outstanding, inherent extrusion stability is obtained with substantially improved draw down for extrusion coating or coextrusion coating applications.

Whereas the incorporation of chemical thermal stabilizers may allow improved extrusion stability as indicated by improved coating web appearance, chemical stabilization tends to appreciably reduce coating drawdown performance. Moreover, chemical stabilization as well as poor extrusion stability ofttimes negatively affect the organoleptic properties of the copolymer which is a critical performance criterion for food packaging. Another significant disadvantage of chemical stabilization and poor extrusion stability is reduced copolymer adhesiveness due to chemical interference at active sites or alteration of active sites or poor substrate contact due to chemical incompatibility or surface distortions or oxidative gels.

The substantially improved extrusion stability of the copolymers of this invention is due to the accomplished narrow molecular weight distribution (and/or less high molecular weight polymer fractions) and reduced long chain branching. Copolymers of the current art are generally characterized by comparatively broader molecular weight distributions and excessive long chain branching, and thereby tend to exhibit long residence distributions during extrusion. Given longer heat histories and the high susceptibility of ethylene/carboxylic acid interpolymers to thermal degradation (as demonstrated by McKinney et al. in U.S. Pat. No. 4,500,664), the final coating, molding or film will invariably exhibit distortions or flow patterns (such as orange peel, die lines or applesauce) or oxidative gels or poor optical properties or a combination thereof.

The instant copolymers of the present invention with their characteristic narrow molecular weight distributions and reduced long chain branching tend to exhibit shorter residence time distributions during extrusion due to the ability to resist chain entanglement and avoid substantial flow into die vortexes and dead-spaces which constitutes die hold-up and extended heat history. For the current art copolymers, given die hold-up (long residence time distributions) and subsequent thermal degradation during extrusion, polymer viscosities undergo increases which attenuates the tendency towards die hold-up by increasing the overall average residence time. Accordingly, long purge times are also an attribute of the current art copolymers.

While copolymers of the current art prepared at synthesis conditions well below the phase boundary (i.e., two-phase products) also possess narrow molecular weight distributions and reduced long chain branching, such copolymers characteristically contain excessive quantities of microgels or "grain" and due to poor homogeneity, such copolymers are found to exhibit inferior draw down, optics, hot tack, heat seal strength and adhesion (as described in U.S. Pat. No. 4,599,392).

The copolymers of the present invention are particularly distinguished from the copolymers disclosed in U.S. Pat. No. 4,599,392 by the utilization of chain-transfer agents to accomplish desirably narrow molecular distributions that are simply not attainable in instances where the available reaction pressure capability has been otherwise exhausted. In each instance where additional reaction pressure is made available, the introduction of a chain-transfer agent would still allow additional narrowing within the precepts of the present invention to the extent that post-reactor crosslinking is a factor and reaction temperature reductions required for compensation and maintenance of high molecular weights is possible above the range of non-randomness and the occurrence of microgels. We have found that relative to the copolymers disclosed in U.S. Pat. No. 4,599,392, substantial narrowing can be accomplished to allow appreciably improved extrusion stability while maintaining good processibility (i.e., extrusion at acceptable motor amperages and die pressures), randomness, high molecular weights and low gels.

The present invention is also distinguished from the art disclosed in U.S. Pat. No. 4,599,392 within, with the utilization of a chain-transfer agent, it provides the option for accomplishing equivalent molecular weight distributions and branching characteristics at substantially lower synthesis conditions. While lower reaction temperatures reduce polymer conversion (production rate), reaction gas entry temperatures can be adjusted for compensation and thereby allow the advantage of reduced reaction pressures and reduced energy costs while still accomplishing the desired molecular weight, molecular weight distribution and branching attributes.

The process of the present invention requires a chain-transfer agent or telogen which is commonly referred to in ethylene homopolymerization art as a coreactant since such compounds can participate in the reaction and can be actually consumed by eventually combining in the copolymerization to form a telomerized copolymer. Broadly, suitable telogens are low molecular weight hydrocarbons that may contain oxygen and/or nitrogen and may be saturated or unsaturated. Suitable telogens will have boiling points less than about 220° C. at atmospheric pressure, preferably less than about 175° C.. Additionally, suitable telogens will have chain-transfer constants or coefficients greater than about 0.0006, preferably in the range of about 0.002 to about 0.1 as indicated by Erhlich and Mortimer in *Advance Polymer Science*, vol. 7, pg. 416 (1970). Suitable compounds include, for example, methanol: propane: t-butyl acetate: ethyl acetate; butane: methyl benzoate: 2,2,4-trimethylpentane; n-hexane: isobutane; ethanol: propylene: n-heptane: cyclohexane: methylcyclohexane: 1,2-dichlorethane: cyclopentane: acetonitrile: acetic anhydride: isobutylene: n-tridecane: acetone: isopropanol: 4,4-dimethylpentane-1: trimethylamine: tetrahydrofuran: cumene: dioxane: diisobutylene: butene-1: toluene: methyl ethyl ketone: 3-methyl-2-butanone: ethylbenzene: and methyl formate and the like. Especially preferred telogens are isobutane, methanol and methyl ethyl ketone. Other effective telogens can be found among the chemicals identified generally as alkanes, alkenes, alcohols, ketones, hydrogen, silanes, cyclic hydrocarbons, aromatic hydrocarbons, halogenated hydrocarbons, sulfoxides, ethers, esters, amines, amides, nitriles, anhydrides, furans, aldehydes, cyanates, sulfides, or hydrocarbon derivatives at concentrations ranging from 0.0001% to 10% and up to about 25% in the total feed to the reactor.

The amount of telogen required for a given interpolymerization depends on a number of factors such as reaction temperature and pressure, unreacted gas recycle rate, comonomer concentration, relative reactivity, the telogenicity of the chain transfer agent and the targeted molecular weight or product melt index. In accordance with the present invention, telogen amounts will vary between about 0.1 to 25 weight percent of the total feed to the reactor and usually between about 0.5 to 12 weight percent for copolymers intended for extrusion applications. To provide the preferred homogeneity, steady state, substantially single-phase operation is required and thereby, the telogen concentration must be maintained substantially constant in the reaction zone once equilibrium is established, preferably varying within 10 percent. Since reaction temperature and pressure have substantial and specific influences on the resultant molecular weight distribution and branching characteristics, both must also be maintained substantially constant once equilibrium is established, preferably varying within 10 percent, and thereby telogen concentration and the copolymer molecular weight must be controlled independent of reaction temperature and pressure, preferably by controlling the telogen injection rate or the unreacted gas recycle (purge) rate or both.

The copolymers of the present invention can be conveniently prepared at reaction pressures from about 18,000 to about 50,000 psi.; at least 1 psi. above the minimum amount needed to produce a single phase reaction mixture, and at about 150° to about 350° C., at least 1 degree above the minimum amount needed to produce a single phase reaction mixture, as long as the phase boundary conditions are appreciably exceeded and the reaction temperature is sufficiently low enough and/or the reaction pressure is sufficiently high enough to allow the benefits of telogen utilization. The preferred reactor is a continuous autoclave with about a 1:1 to about a 16:1 length to diameter ratio. The reactor may consist of one or more reaction zone(s) by installation of baffling systems common in the art: the reactor may also be in series with one or more other reactors and the reactor may additionally be provided with one or more comonomer entry point(s) as described in British Pat. No. 1,096,945. When more than one reaction zone is employed as in instances of baffling, the reactor(s) can be maintained to provide an "intrazone" and/or "interzone" constant environment or it is possible to operate in such a manner that a gradient of environments exists between and/or within zones and/or reactors as long as the phase boundary conditions are appreciably exceeded and the benefits of telogen utilization are attainable.

The products of this invention can be prepared with or without the use of additional solvent or hydrocarbons for telogen combinations (i.e., two or more different chain-transfer agents) and/or as carriers for the comonomer(s) and/or initiator(s). These products are also useful as base resins for the preparation of ionic copolymers, known in the art as "ionomers", where-from additional improvements in optics, chemical resistance and hot tack strength are readily obtained. The gels that often characterize ethylene/carboxylic acid interpolymers can be of many different shapes, varying sizes and of more than one origin. For instance, in accordance with this disclosure, microgels or "grain" (i.e., very small and fine gels) occur due to operating within and/or in close proximity of a respective phase boundary. Conversely, large gels (i.e., gels >25 microns in diameter) are usually an attribute or the result of thermal oxidation or degradation which occurs where polymer heat history is excessive, such as in extrusions or melt-blendings.

In this disclosure, for example, the following gel rating is used:

| GEL RATING* | |
|---|---|
| RATING | CRITERIA |
| 0 | No visible gels |
| 1 | Very few microgels |
| 2 | Some microgels |
| 3 | Some microgels, some large gels |
| 4 | Numerous microgels, some large gels |
| 5 | Numerous microgels, numerous large gels |
| 6 | Severe gels |

*Rating according to criteria by visual inspection of blown film samples.

For instances where the microgel content is negligible (due to synthesis sufficiently above the respective phase boundary) and oxidative gels are predominant, actual gel counting was performed.

The following examples are intended to illustrate the embodiments of the present invention, however the invention is not limited to the embodiments illustrated.

EXAMPLE 1 (for comparison purposes)

An ethylene/acrylic acid copolymer containing 6.5 percent acrylic acid by weight and having a 5.5 g/10 minute melt index (ASTM D1238E) was prepared at about 3500–4500 psi. above and about 15°–25° C. above that of its respective phase boundary. The copolymer for its given acrylic acid concentration and melt index possessed a relatively broad molecular weight distribution (i.e., 7.7 $MW_w/MW_n$ ratio as determined from gel permeation chromatography analysis) and relatively high levels of long chain branching (i.e., an intrinsic viscosity of 8.934 dl/mg as determined by solution viscosity analysis). When extrusion coated at a 289° C. melt temperature and 85 rpms. screw speed on a Black-Clawson extrusion coater with a 30:1 L/D and a 25-inch slot die, the copolymer exhibited 14.7 oxidative gels per 345 feet of web and a relatively low draw-down speed (i.e., the thinnest coating attainable without web rupture was 1.26 mils).

EXAMPLE 2

Conversely, a 6.5 percent acrylic acid (by weight) copolymer having the same melt index was prepared with about 1.93 weight percent of the total reactor feed comprised of isobutane and at about 5500–6500 psi. above and about 0°–10° C. above its corresponding phase boundary. This copolymer possessed a narrow molecular weight distribution (i.e., 5.9 $MW_w/MW_n$ ratio) and reduced long chain branching (i.e., a solution intrinsic viscosity of 3.070 dl/mg). When extrusion coated on the Black-Clawson at 289° C. melt temperature and 85 rpms. screw speed, this copolymer exhibited 3.0 oxidative gels per 345 web feet and a high draw-down speed i.e., a coating thickness of 0.70 was successfully achieved.

Data for the above examples and for additional samples of ethylene-acrylic acid copolymers are shown in the following tables. Whereas Examples 1, 5, and 7 are examples where prior art was used in making random copolymers above their respective MWD boundary with low microgel levels. Examples 2, 3, 4, 6, and 8 illustrate the various embodiments of the present invention where a chain-transfer agent was employed to accomplish narrower molecular weight distributions and reduced long chain branching while remaining above respective phase boundaries.

Additionally, whereas Example 9 is an example of prior art used in making non-random copolymers above their respective phase boundary and Example 10 is an example of prior art used in making random copolymers above their respective phase boundary, Example 11 illustrates another embodiment of the present invention where methanol was employed to accomplish a narrower weight distribution with low microgel levels at temperatures otherwise below the corresponding phase boundary i.e., methanol effectively shifted phase-equilibria.

In the following Tables I-IV, the example numbers marked with an asterisk contain no telogen and do not represent the presently claimed invention.

TABLE I

| | Example 1* | Example 2 |
|---|---|---|
| INTRINSIC PROPERTIES | | |
| Percent Acrylic Acid ±0.25 | 6.5 | 6.5 |
| Melt Index g/10 min. ±0.25 | 5.35 | 5.35 |
| $MW_w/MW_n$ (GPC)* | 7.7 | 5.9 |
| Intrinsic Viscosity, dl/mg | 8.934 | 3.070 |
| SYNTHESIS CONDITIONS | | |
| Percent Isobutane in feed | 0.0 | 1.93 |
| Synthesis Temperature Above Phase Boundary (°C.) | 15–25 | 0–10 |
| Synthesis Pressure Above MWD Boundary (psi) | 0–500 | 1500–2500 |
| EXTRUSION PROPERTIES | | |
| Oxidative Gels (per 345 web feet) | 14.7 | 3.0 |
| Percent MI Reduction | 20.0 | 6.0 |
| Flow Pattern Count | 2 | 1 |
| Total Flow Pattern Width (in) | 0.5 | 0.5 |
| Minimum Coating Thickness at 315° C. extrusion temp (mils) | 1.26 | 0.70 |
| Relative Extrusion Stability | 18.5 | 1.05 |
| | Example 3 | Example 4 |
| INTRINSIC PROPERTIES | | |
| Percent Acrylic Acid ±0.25 | 6.5 | 6.5 |
| Melt Index g/10 min. ±0.25 | 5.35 | 5.35 |
| $MW_w/MW_n$ (GPC)* | 5.6 | 5.3 |
| Intrinsic Viscosity, dl/mg | 2.959 | 2.110 |
| SYNTHESIS CONDITIONS | | |
| Percent Isobutane in feed | 2.88 | 3.70 |
| Synthesis Temperature Above Phase Boundary (°C.) | 15–25 | 0–10 |
| Synthesis Pressure Above MWD Boundary (psi) | 3500–4500 | 3500–4500 |
| EXTRUSION PROPERTIES | | |
| Oxidative Gels (per 345 web feet) | 0.0 | 1.8 |
| Percent MI Reduction | 6.0 | — |
| Flow Pattern Count | 1 | 1 |
| Total Flow Pattern Width (in) | 0.125 | 0.5 |
| Minimum Coating Thickness at 315° C. extrusion temp (mils) | 0.78 | 0.57 |

TABLE I-continued

| Relative Extrusion Stability | 0.58 | 0.51 |
|---|---|---|

GPC refers to gel permeation chromatography used to determine molecular weight distributions.
Extrusions were performed on a 30:1 L/D Black-Clawson extrusion coater equipped with a 24 in. slot die operating at 85 rpms screw speed and 286° C. melt temp.
MI Reduction refers to the difference between the melt index measured before and after extrusion (in accordance with ASTM D1238E). Lower values are indicative of improved extrusion stability i.e., resistance to crosslinking.
Flow Patterns appear in film or coatings as continuous bands of "applesauce" or "orange peel". Higher values for width and/or total number indicate inferior web quality or poor extrusion stability.
Minimum Coating Thickness is the thinnest coating achievable prior to web rupture. Lower values are indicative of superior draw-down and improved extrusion stability.
Relative Extrusion Stability is calculated from (gels * flow patterns * total flow pattern width * draw-down). The calculation is provided as a summarization and lower values indicate improved stability.

TABLE II

|  | Example 5* | Example 6 |
|---|---|---|
| INTRINSIC PROPERTIES |  |  |
| Percent Acrylic Acid ±0.25 | 3.0 | 3.0 |
| Melt Index g/10 min. ±0.50 | 11.1 | 11.1 |
| MWw/MWn (GPC)* | 9.3 | 9.4 |
| Weight Percent Polymer ≧487,000 Mol. Wt. (GPC) | 6.86 | 5.94 |
| SYNETHESIS CONDITIONS |  |  |
| Percent Isobutane in feed | 0.0 | 1.40 |
| Synthesis Pressure Above Phase Boundary (psi) | 2500–3500 | 2500–3500 |
| Synthesis Temperature Above Phase Boundary (°C.) | 25–35 | 0–10 |
| EXTRUSION PROPERTIES |  |  |
| Oxidative Gels @289° C. (per 345 web feet) | 9.1 | ≦0.9 |
| Total Flow Patterns @315° C. | 7.0 | 1.0 |
| Minimum Coating Thickness at 289° C. extrusion temp (mils) | 0.49 | 0.28 |
| Relative Extrusion Stability | 31.2 | ≦0.25 |

GPC refers to gel permeation chromatography used to determine molecular weight distributions as well as to perform fractional weight percent analysis.
Extrusions were performed on a 30:1 L/D Black-Clawson extrusion coater equipped with a 24 in. slot die operating at 85 rpms screw speed and 289° C. or 315° C. melt temperatures.
Flow Patterns appear in the film or coatings as continuous bands of "applesauce" or "orange peel" or as die lines. Higher values indicates inferior web quality or poor extrusion stability.
Minimum Coating Thickness is the thinnest coating achievable prior to web rupture. Lower values are indicative of superior draw-down and improved extrusion stability.
Relative Extrusion Stability is calculated from (gels * total flow patterns * draw-down). The calculation is provided as a summarization and lower values indicate improved stability.

TABLE III

|  | Example 7* | Example 8 |
|---|---|---|
| INTRINSIC PROPERTIES |  |  |
| Percent Acrylic Acid ±0.25 | 6.5 | 6.5 |
| Melt Index g/10 min. ±1.0 | 8.8 | 8.8 |
| MWw/MWn (GPC)* | 9.8 | 7.9 |
| SYNTHESIS CONDITIONS |  |  |
| Percent Isobutane in feed | 0.0 | 3.30 |
| Synthesis Temperature Above Phase Boundary (°C.) | 22–32 | 0–10 |
| Synthesis Pressure Above MWD Boundary (psi) | 500–1500 | 500–1500 |
| EXTRUSION PROPERTIES |  |  |
| Total Flow Pattern Width at 85 rpm (in) | 6.0 | 2.0 |
| Total Flow Pattern Width at 40 rpm (in) | 6.0 | 3.0 |
| Minimum Coating Thickness at 289° C. extrusion temp (mils) | 0.41 | <0.31 |
| Relative Extrusion Stability | 14.8 | 1.9 |

GPC refers to gel permeation chromatography used to determine molecular weight distributions.
Extrusions were performed on a 30:1 L/D Black-Clawson extrusion coater equipped with a 24 in. slot die operating at 40 or 85 rpms screw speed and 286° C. melt temp.
Flow Patterns appear in film or coatings as continuous bands of "applesauce" or "orange peel". Higher values for width and/or total number indicate inferior web quality or poor extrusion stability.
Minimum Coating Thickness is the thinnest coating achievable prior to web rupture. Lower values are indicative of superior draw-down and improved extrusion stability.
Relative Extrusion Stability is calculated from (gels * total flow pattern width at 85 rpms * total flow pattern width at 40 rpms * draw-down). The calculation is provided as a summarization and lower values indicate improved stability.

TABLE IV

|  | Example 9* | Example 10* | Example 11 |
|---|---|---|---|
| INTRINSIC PROPERTIES |  |  |  |
| Percent Acrylic Acid ±0.70 | 9.7 | 9.7 | 9.7 |
| Melt Index g/10 min. ±1.1 | 4.1 | 4.1 | 4.1 |
| MWw/MWn (GPC)* | 6.8 | 9.6 | 6.6 |
| Weight percent Polymer ≧481,000 Molt. Wt. (GPC) | 4.56 | 3.28 | 3.24 |
| Randomness | non-random | random | random |
| SYNTHESIS CONDITIONS |  |  |  |
| Percent Methanol in feed | 0.0 | 0.0 | 2.9 |
| Synthesis Pressure Above MWD Boundary (psi) | (3500–4500) | 3500–4500 | 3500–4500 |
| Synthesis Temperature Below Phase Boundary (°C.) | (5–15) | (0–10) | 0–10 |
| BLOWN FILM PROPERTIES |  |  |  |
| Gel Rating | 1.5 | 4.75 | 2.0 |
| Percent Film Haze | 6.64 | 6.69 | 3.47 |
| 20 Degree Film Gloss | 28.6 | 32.1 | 55.0 |
| 45 Degree Film Gloss | 59.9 | 63.7 | 74.7 |
| Relative Extrusion Stability | 11.3 | 33.2 | 5.4 |

( ) connects above the phase boundary.
GPC refers to gel permeation chromatography used to determine molecular weight distributions as well as to perform fractional weight percent analysis.
Randomness is defined as having a ratio of weight percent adjacent acid to total weight percent carboxylic acid in the copolymer less than 0.44 as determined in accordance with U.S. Pat. No. 4,248,990.
Blown film was prepared at 204° C. on a 24:1 L/D NRM film unit at a 2.25 BURand 1.5 mils.
Film haze and gloss determinations were performed in accordance with ASTM higher gloss values and lower haze values are indicative of superior film optics and improved extrusion stability.
Relative Extrusion Stability is calculated form [(gel rating * haze)/(20 + 45 gloss) * 100]. The calculation is provided as a summarization and lower values indicate improved stability.

We claim:

1. A process for producing high molecular weight, modified, homogeneous, random interpolymers having melt flow rates in the range of about 0.1 to about 300 g/10 min., as determined by ASTM D-1238 (190° C./2160 g) and reduced long chain branching, comprising about 99% to about 65% by weight of ethylene monomer and about 1% to about 35% by weight of at least one olefinically unsaturated comonomer selected from the group consisting of unsaturated carboxylic acids, alkyl acrylates and alkyl methacrylates, said process comprising interpolymerizing the monomers in a substantially constant environment, under steady state conditions, in a single-phase reaction mixture, in the presence of minor amounts of one or more telogenic modifiers, under the influence of a free-radical initiator, and in a well-stirred autoclave reactor operated in a continuous manner and at an unreacted gas recycle rate sufficient to produce said high molecular weight interpolymers as the monomers, telogenic modifier(s), and initiator are fed into the reactor and the reaction mixture is withdrawn, said process being characterized by the use of synthesis conditions of temperature and pressure which are elevated to a level above the phase boundary between two-phase and single-phase operation and further characterized by the use of either, or both of, (a) a temperature which is lower than, or (b) a pressure which is higher than that which would be required without the presence of the modifier, said process further characterized by controlling said minor amounts of said one or more telogenic modifiers and said high molecular weight of said interpolymers by controlling said telogenic modifier(s) feed rate, or unreacted gas recycle rate, or both.

2. The process of claim 1 wherein the olefinically-unsaturated comonomer comprises acrylic acid or methacrylic acid.

3. The process of claim 1 wherein the olefinically-unsaturated comonomer is acrylic acid.

4. The process of claim 1 wherein the olefinically-unsaturated comonomer is methacrylic acid.

5. The process of claim 1 wherein the so-produced interpolymers comprise from about 99% to about 88% by weight of ethylene units in the polymer chain, the remaining percentage comprising acrylic acid units, except for the terminal telogen groups on the polymer chains.

6. The process of claim 1 wherein the so-produced interpolymers comprise from about 99% to about 88% by weight of ethylene units in the polymer chain.

7. The process of claim 1 wherein the modifier or modifiers comprise at least one of alkanes, alkenes, alcohols, ketones, hydrogen, silanes, cyclic hydrocarbons, aromatic hydrocarbons, halogenated hydrocarbons, sulfoxides, ethers, esters, amines, amides, nitriles, anhydrides, furans, aldehydes, cyanates, or sulfides at concentrations from about 0.0001% to about 10% by weight.

8. The process of claim 1 wherein the modifier or modifiers comprises an alkane.

9. The process of claim 1 wherein the modifier or modifiers comprises an alcohol.

10. The process of claim 1 wherein the modifier is isobutane.

11. The process of claim 1 wherein the modifier is methanol.

12. The process of claim 1 wherein the synthesis conditions comprise an elevated temperature which is in the range of about 150° C. to about 350° C. and an elevated pressure which is in the range of about 18,000 to about 50,000 psi., wherein said pressure is at least 1 psi. above, and said temperature is at least 1 degree above the minimum amount needed to produce a single-phase reaction mixture and in the presence of sufficient modifier such that either, or both, of (a) the pressure is above or (b) the temperature is below that typically required to produce a single-phase reaction mixture without the modifier.

13. A process for producing substantially homogeneous, high molecular weight random interpolymers having melt flow rates in the range of about 0.1 to about 300 g/10 minutes, as determined by ASTM D-1238 (190° C./2160 g) a narrow molecular weight distribution and/or less high molecular weight polymer fractions and reduced long chain branching, comprising about 99% to about 65% by weight of ethylene monomer with about 1% to about 35% by weight of at least one copolymerizable olefinically-unsaturated comonomer selected from the group consisting of an unsaturated carboxylic acids, alkyl acrylates and alkyl methacrylates, said process comprising interpolymerizing the monomers in a well-stirred autoclave reactor operated in a continuous manner and at an unreacted gas recycle rate sufficient to produce said high molecular weight interpolymers at steady state conditions using a free-radical polymerization initiator under substantially constant conditions of temperature, pressure, and flow rates, wherein the conditions of temperature and pressure required to produce operation at the phase boundary are exceeded while reacting in the presence of one or more polymerization modifiers selected from the group consisting of alkanes, alkenes, alcohols, ketones, hydrogen, silanes, cyclic hydrocarbons, aromatic hydrocarbons, halogenated hydrocarbons, sulfoxides, ethers, esteres, amines, amides, nitriles, anhydriedes, furans, aldehydes, cyanates, or sulfides, at concentrations from about 0.0001 weight % to about 10 weight % thereby producing an interpolymer having less long chain branching and wherein the conditions of flow rates of the polymerization modifiers(s) are controlled to control said molecular weights of said interpolymers.

14. The process of claim 13 wherein the copolymerizable olefinically-unsaturated comonomer comprises an unsaturated carboxylic acid.

15. The process of claim 13 wherein the copolymerizable olefinically-unsaturated comonomer comprises acrylic acid or methacrylic acid.

16. The process of claim 13 wherein the copolymerizable olefinically-unsaturated comonomer is acrylic acid.

17. The process of claim 13 wherein the copolymerizable olefinically-unsaturated comonomer is methacrylic acid.

18. The process of claim 13 wherein the modifier comprises one or more alkanes.

19. The process of claim 13 wherein the modifier comprises an alcohol.

20. The process of claim 13 wherein the modifier is isobutane.

21. The process of claim 13 wherein the modifier is methanol.

* * * * *